United States Patent
Barth et al.

(10) Patent No.: US 10,034,576 B2
(45) Date of Patent: Jul. 31, 2018

(54) CONTROL, REGULATION AND OPERATING DEVICE FOR A COOKING APPLIANCE

(71) Applicant: WMF Wuerttembergische Metallwarenfabrik AG, Geislingen/Steige (DE)

(72) Inventors: Peter Barth, Schelklingen (DE); Matthias Doeppe, Langenau (DE); Martin Neumayer, Gerstetten-Dettingen (DE); Reinhold Von Bank, Semmerhof (DE)

(73) Assignee: WMF WUERTTEMBERGISCHE METALLWARENFABRIK AG, Geislingen/Steige (DE)

( * ) Notice: Subject to any disclaimer, the term of this patent is extended or adjusted under 35 U.S.C. 154(b) by 0 days.

(21) Appl. No.: 14/355,285

(22) PCT Filed: Oct. 10, 2012

(86) PCT No.: PCT/EP2012/070085
§ 371 (c)(1),
(2) Date: Apr. 30, 2014

(87) PCT Pub. No.: WO2013/064348
PCT Pub. Date: May 10, 2013

(65) Prior Publication Data
US 2014/0292536 A1    Oct. 2, 2014

(30) Foreign Application Priority Data
Oct. 31, 2011    (DE) .................. 10 2011 085 526

(51) Int. Cl.
*H04Q 9/00* (2006.01)
*A47J 36/32* (2006.01)
*G08C 17/02* (2006.01)

(52) U.S. Cl.
CPC .............. *A47J 36/32* (2013.01); *G08C 17/02* (2013.01)

(58) Field of Classification Search
None
See application file for complete search history.

(56) References Cited

U.S. PATENT DOCUMENTS 4,405,991 A * 9/1983 Stanley ................... F24C 7/082
219/704
5,951,900 A * 9/1999 Smrke ..................... A47J 27/62
219/431

(Continued)

FOREIGN PATENT DOCUMENTS

DE    10 2008 051    4/2010
DE    20 2011 003 293    7/2011

(Continued)

OTHER PUBLICATIONS

International Search Report dated Apr. 8, 2013.
Canadian Office Action dated Dec. 12, 2014.

*Primary Examiner* — Brian Zimmerman
*Assistant Examiner* — Kevin Lau
(74) *Attorney, Agent, or Firm* — Gerald E. Hespos; Michael J. Porco; Matthew T. Hespos

(57) ABSTRACT

The invention relates to a control, regulation and operating device (1) for a cooking appliance (2), comprising at least one primary unit (3) which can be mounted on the cooking appliance (2) and is designed to communicate wirelessly with a secondary unit (4). The primary unit (3) is designed as a sensor device (5) for detecting at least one parameter that influences the cooking process and for transmitting the same to the secondary unit (4), whereas the secondary unit (4) is designed to evaluate and process the data received from the primary unit (3) and for displaying and/or sending corresponding handling instructions to the primary unit (3), (Continued)

and wherein the secondary unit (4) is configured as a smartphone, a laptop, a tablet PC, a pager or a PC. In this way, monitoring of the cooking process can be achieved in a simple manner using, for example, a smartphone.

19 Claims, 2 Drawing Sheets

(56) References Cited

U.S. PATENT DOCUMENTS

| | | | | |
|---|---|---|---|---|
| 6,698,923 | B2* | 3/2004 | Bedetti | A47J 43/28 374/149 |
| 2008/0031984 | A1 | 2/2008 | Quart | |
| 2008/0043809 | A1* | 2/2008 | Herbert | G01K 1/026 374/163 |
| 2008/0290090 | A1* | 11/2008 | Kindler | A47J 27/0802 220/203.05 |
| 2009/0092723 | A1 | 4/2009 | Flynn, Jr. et al. | |
| 2009/0193683 | A1 | 8/2009 | Igdari | |
| 2009/0315727 | A1* | 12/2009 | Goltenboth | H05B 6/645 340/586 |
| 2010/0313768 | A1* | 12/2010 | Koether | A47J 27/62 99/325 |
| 2011/0132201 | A1* | 6/2011 | Richardson | F24C 7/08 99/325 |
| 2012/0199643 | A1* | 8/2012 | Minnick | G06F 17/30879 235/375 |
| 2013/0238816 | A1 | 9/2013 | Skog | |

FOREIGN PATENT DOCUMENTS

| | | |
|---|---|---|
| FR | 2 931 648 | 12/2009 |
| JP | 4-130717 | 11/1992 |
| JP | 2001004145 A * | 1/2001 |
| JP | 2006-280789 | 10/2006 |
| JP | 2009022362 A * | 2/2009 |

* cited by examiner

CONTROL, REGULATION AND OPERATING DEVICE FOR A COOKING APPLIANCE

BACKGROUND

1. Field of the Invention

The present invention relates to a control, regulation and operating device for a cooking appliance.

2. Description of the Related Art

In order to be able to simplify the cooking of food, a plurality of aids such as timers and/or temperature indicators are known. Such timers or temperature indicators, however, exclusively detect an individual parameter which however, does not take into account other parameters which also affect the cooking process. If, for example, a predefined cooking time is set on the timer, once the time set on the timer has elapsed, a good cooking result remains uncertain because the timer is not able to take into account the cooking temperature inside the cooking appliance and/or individual cooking data of the respective food being cooked. For this reason the results achieved by means of the previously mentioned aids are often unsatisfactory thereby in particular spoiling the joy of cooking for the unpractised layman.

Also, use is made increasingly of cooking systems which can communicate via radio with the energy source such as a cooker. Such cooking systems, apart from purely monitoring time, temperature and/or pressure, have the capability of controlling the cooker such that for example pre-programmed cooking programs can be executed. The big disadvantage of such cooking systems is, however, its comparatively cumbersome technology which is expensive to the point where it has so far been employed only in the gastronomic field.

The present invention therefore addresses the problem of proposing control, regulation and operating devices for a cooking appliance, which enable a cooking process to be monitored also in the private field.

SUMMARY OF THE INVENTION

The present invention is based on the idea to propose a control, regulation and operating device for a cooking appliance, which essentially consists of at least one primary unit attachable to the associated cooking appliance and a secondary unit wirelessly communicating therewith. The primary unit is designed as a sensor device and is able to detect at least one parameter influencing the cooking process taking place inside the respective cooking appliance and to transmit the same to the secondary unit. The secondary unit in turn may be for example configured as a smartphone, laptop, tablet-PC, pager or PC, and is designed to evaluate and process the data received from the primary unit and for displaying and/or sending corresponding handling instructions to the primary unit. The sensor device can e.g. analogously detect a temperature or pressure signal and digitise this with the aid of a measurement form converter in order to transmit it, for example via a wireless interface, to the secondary unit. The secondary unit configured in particular as a smartphone then processes the incoming signals and outputs corresponding handling instructions, e.g. on a display of the secondary unit or on the primary unit so that in principle there exists a bidirectional communication between the primary unit and the secondary unit. The control, regulation and operating device according to the invention thus makes it possible for the first time, to monitor and possibly to control a cooking process in a simple but effective manner by means of a simple smartphone or a laptop and associated applications, so-called apps. It is of course possible to monitor several primary units by means of a single secondary unit. It is also feasible for corresponding cooking programs to be stored on the respective secondary unit such as a smartphone, by means of which the corresponding handling instructions selected in dependence of the signals received from the primary unit can be calculated/selected.

With an advantageous further development of the solution according to the invention the secondary unit comprises a data store in which food-specific cooking data is stored taking the RGT rule (reaction speed temperature rule) into account, wherein the secondary unit is designed for controlling/regulating the cooking process in the respective appliance in dependence of the chosen foods and the RGT rule. The RGT rule is essential for an optimal preparation of the foods since the cooking temperature determines the necessary cooking time. For if the cooking temperature in the cooking appliance rises, the secondary unit is able to adjust, i.e. reduce, the remaining cooking time accordingly with the aid of corresponding programs and the RGT rule.

Conveniently the secondary unit is designed such that starting with the food with the longest cooking time, it ascertains and displays a correspondingly optimal point in time for adding the food with the next-shorter cooking time. Since the preferred cooking temperatures are known to the secondary unit, e.g. the smartphone/computer, the sequence of adding food to the cooking appliance can thus be calculated in advance with the aid of the respectively suitable cooking times and then be communicated to the user at the appropriate time via the secondary unit during the cooking process. The advantage consists in that all foods are ready to eat at the same time, wherein at the same time the danger of being burnt by hot water vapour due to prematurely removing individual foods can be excluded.

With a further advantageous embodiment of the solution according to the invention food-specific required cooking values which in particular take the RGT rule into account are stored in a data store of the secondary unit, wherein the primary unit is designed for detecting at least one actual cooking value. By comparing the required and actual cooking values the secondary unit is able to calculate corresponding handling instructions and at the same time display these to the user. It is feasible that the secondary unit, e.g. the smartphone, by way of the actual inside temperature in the cooking appliance (actual cooking temperature) and the specified required cooking temperature, outputs assistance to the user for manual control of the cooker. This may e.g. be done by displaying a bar or an arrow on the display of the secondary unit, wherein the length of the arrow correlates to the required/actual cooking value deviation and in addition the arrow may be displayed so as to be direction-dependent, depending on whether the actual cooking temperature detected inside the cooking appliance is too low or too high, and therefore the heating output of the cooker needs to be increased or decreased. Using a corresponding app (application) on the associated smartphone, monitoring and simultaneously controlling the cooking process is thus comparatively easy and can be done professionally. It is, of course, left to the user to change or accept the cooking values specified by the secondary unit.

With the aid of the control, regulation and operating device according to the invention it is possible for the first time to offer a mass-market-suitable solution for monitoring and controlling the cooking process, which, using a primary unit, a secondary unit and corresponding software, permits an intelligent remaining cooking time to be calculated on the basis of the RGT rule together with cooked product management (different points in time for adding food).

Further important features and advantages of the invention are revealed in the sub-claims, the drawings and the associated figure description with reference to the drawings.

It is understood that the above-mentioned features and the features explained hereunder can be utilised not only in the respectively given combination but also in other combinations or on their own, without deviating from the scope of the present invention.

Preferred embodiments of the invention are shown in the drawings and will be explained in detail in the description hereunder, wherein identical reference symbols refer to identical or functionally identical components.

DETAILED DESCRIPTION OF THE PREFERRED EMBODIMENTS

Figure 1:
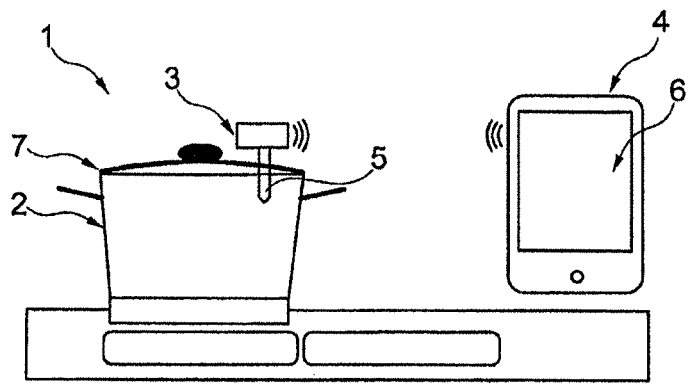
FIG. 1 shows a schematic view of a control, regulation and operating device according to the invention.

According to FIG. 1 a control, regulation and operating device 1 according to the invention for at least one cooking appliance 2 comprises a primary unit 3 attachable thereto, which is designed to wirelessly communicate with a secondary unit 4. The primary unit 3 comprises a sensor device 5 for detecting at least one parameter in the cooking appliance 2 which influences the cooking process, and at the same time is designed for wirelessly communicating such a parameter to the secondary unit 4. Wireless in this case means e.g. communication by radio, W-LAN, Bluetooth, GSM, UMTS, DECT or RFID. The secondary unit 4 which may be configured, in particular, as a smartphone but also as a laptop, table-PC, pager or PC, can evaluate and process the data received from the primary unit 3, and therefrom calculate or ascertain corresponding handling instructions and display these on a corresponding display 6 or transmit such handling instructions wirelessly to a primary unit 3. The control, regulation and operating device according to the invention thus also permits simple and low-cost monitoring of cooking processes, in particular in the private field. In particular when using modern smartphones or tablet PCs associated applications, so-called apps, can be additionally used in which not only food-specific data but whole cooking programs are stored.

The secondary unit 4 may, of course, have food-specific cooking data stored in a corresponding data store taking the RGT rule (reaction speed-temperature rule) into account, wherein in this case the above mentioned apps for controlling/regulating the cooking process in dependence of the chosen food and the RGT rule are utilised.

The sensor device 5 comprises at least one temperature sensor such as a NTC or PTC resistor, a pressure sensor and/or a filling level sensor. Also feasible are sensors such as a thermographic sensor, a core temperature sensor and/or a pressure sensor based on the piezo principle. The primary unit 3 is detachably attached to a lid 7 of the cooking appliance 2.

Figure 2:
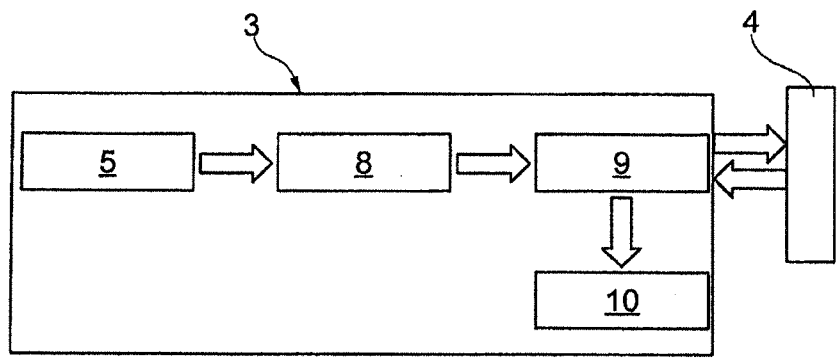
FIG. 2 shows a schematic construction of the primary unit and the secondary unit.

Looking now at FIG. 2, the principal construction of the secondary unit 3 can be recognised. The secondary unit 3 comprises the sensor device 5 which detects e.g. a temperature signal in an analogue manner. An analogue-digital converter 8, e.g. a measurement form converter, converts the analogously received signal into a digital signal and transmits this to a transmitting/receiving device 9, e.g. a radio module or an antenna. The corresponding signal is transmitted wirelessly from this transmitting/receiving device to the secondary unit 4, or respective handling instructions are received therefrom. The received signals or handling instructions can then be displayed via a display 10, e.g. a display or LEDs.

In addition the secondary unit 4 is designed such that taking the food with the longest cooking time as a starting point, it ascertains a respectively optimal point in time for adding the food with next shorter cooking time and displaying this via the display 6. It is also able to display different completion points in time for chosen foods with different cooking temperatures, or to calculate a common completion point in time averaged over all chosen foods and to display this on the display 6.

Figure 4:
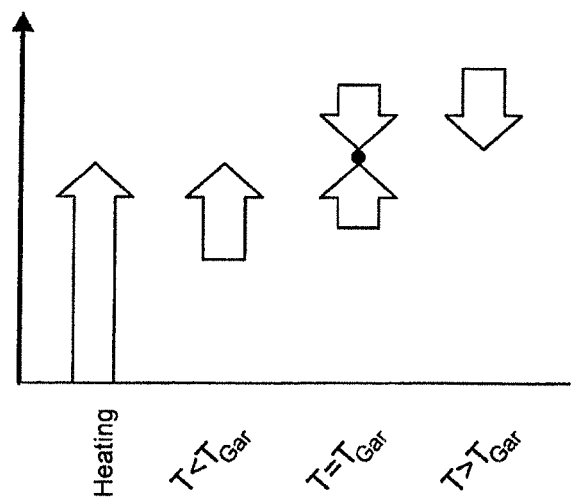
FIG. 4 shows a possible schematic visualisation of an actual-required cooking temperature deviation on the secondary unit.

In addition the secondary unit 4 may have food-specific cooking data in the form of required cooking values, in particular taking the RGT rule into account, stored in it, wherein the primary unit 3 is designed for detecting actual cooking values. Via the display 6 of the secondary unit 4 a required/actual-cooking value deviation can then be displayed such as shown in FIG. 4. Moreover the secondary unit 4 is able to derive a corresponding handling instruction from the ascertained required/actual-cooking value deviation and to display this. It can also transmit a corresponding signal to the primary unit 3 or a cooker, if it ascertains that a predefined required/actual-cooking value range has been exceeded.

Utilising the control, regulation and operating device 1 according to the invention it is moreover possible to simultaneously monitor several cooking processes, in particular to control the cooking of more than one food inside the one cooking appliance 2 or in several cooking appliances 2. Since the individual cooking temperature or cooking time is known to the secondary unit 4, the sequence of adding foods to the respective cooking appliance 2 can be calculated in advance with the aid of the respective cooking times and then communicated to the user at a suitable time via the display 6 of the secondary unit 4. The big advantage consists in that all foods will have been cooked at roughly the same time, wherein it is possible to preferably altogether exclude the danger of being burnt by hot water vapour due to the premature removal of individual foods. In order to improve the overall control about which of the individual cooking appliances 2 was chosen for the addition of the respective food, the secondary unit 4 may at the same time send a corresponding signal to the respective primary unit 3, whereupon this then outputs a corresponding signal via, for example, a LED, a buzzer or a vibration mechanism to the user.

Figure 3:
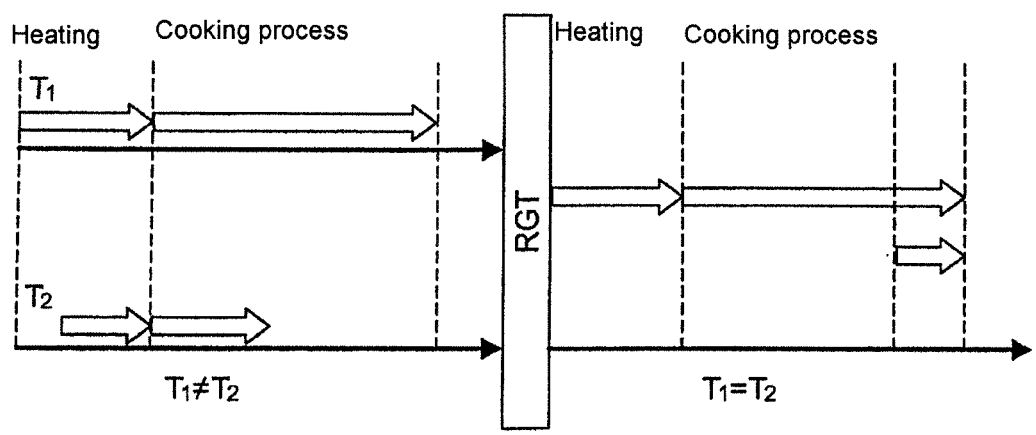
FIG. 3 shows a flow diagram for adjusting different cooking time of different foods.

If two or more foods are to be cooked in one and the same cooking appliance 2 it may happen that only cooking times for different cooking temperatures are known. A remedy for this is offered by the RGT rule such as shown in FIG. 3 so that for different foods with different cooking temperatures T1 and T2 a common cooking temperature is calculated via the RGT rule, which temperature is lower than e.g. the cooking temperature T1 and higher than the cooking temperature T2, wherein then different points in time for adding the respective foods are calculated and displayed. Following evaluation of the RGT rule the secondary unit 4 can thus select a common new cooking temperature as well as the respective individual points in time when food has to be added in such a way that both foods are ready at the same point in time.

In FIG. 4 a representation on the display 6 is shown, in which corresponding handling instructions are depicted in dependence of a performed required/actual-cooking value comparison. If, for example, the ascertained cooking temperature is too low a respective arrow (pointing upwards) for more heating can be displayed. The length of the arrow correlates to the degree of the required/actual-cooking value deviation or in particular to the ascertained required/actual-cooking temperature deviation. If the ascertained cooking temperature T is lower than the specified required cooking temperature TGAR, the arrow, in dependence of the ascertained required/actual-cooking temperature deviation, points e.g. upwards, whereas for an ascertained cooking temperature T, which is higher than the specified cooking temperature TGAR, an arrow pointing downwards is shown. FIG. 4 thus represents a visualisation of the difference between the desired cooking temperature TGAR, i.e. the specified cooking temperature TGAR, and the actual cooking temperature T. If the specified cooking temperature TGAR and the actually present actual cooking temperature T match, two arrows opposing one another may be displayed.

The control, regulation and operating device 1 according to the invention can be utilised to monitor and control the cooking process also in the non-commercial, i.e. non-gastronomic field, by means of a simple smartphone or table PC.

The invention claimed is:

1. A system for regulating operations of a cooking process, the system comprising:
a cooking appliance configured for concurrently cooking a first food and a second food, wherein the first food is different from the second food;
a primary unit including an indicator for indicating cooking instructions to a user and a transmitting/receiving device for wireless communication, the primary unit configured to be removably mounted on the cooking appliance; and
a remote regulating unit physically separated from the primary unit and cooking appliance, the remote regulating unit configured for wirelessly communicating with the transmitting/receiving device of the primary unit;
wherein the remote regulating unit is configured to calculate a fixed intermediate temperature for cooking the first and second foods concurrently;
wherein the remote regulating unit is further configured to calculate a first cook time for cooking the first food at the fixed intermediate temperature and a second cook time for cooking the second food at the fixed intermediate temperature;
wherein the remote regulating unit is further configured to calculate first and second start times based on the first and second cook times, the first start time defining when the first food should be added to the cooking appliance and the second start time defining when the second food should be added to the cooking appliance, the first and second start times being calculated so that the cooking appliance operating at the fixed intermediate temperature completes the cooking of the first and second foods at the same time; and
wherein the remote regulating unit is further configured to wirelessly transmit handling instructions to the primary unit to instruct the user when to add the first and second foods to the cooking appliance based on the first and second start times and to instruct the user to maintain the cooking appliance at the fixed intermediate temperature.

2. The system of claim 1, further comprising a data storage device incorporated in the remote regulating unit, the data storage device configured to store optimal cooking temperatures and optimal cooking times for at least the first and second foods.

3. The system of claim 2, wherein the data storage device is configured to store food-specific cooking data taking the RGT rule (reaction speed-temperature rule) into account, and wherein the remote regulating unit is configured to regulate the cooking process based on the RGT rule and the first and second foods to be cooked.

4. The system of claim 3, wherein the primary unit is configured to detect an actual cooking temperature and the remote regulating unit is configured to ascertain a deviation between the actual cooking temperature and the fixed intermediate temperature.

5. The system of claim 4, wherein the remote regulating unit is configured to calculate adjusted handling instructions based on the ascertained deviation.

6. The system of claim 1, wherein the primary unit further includes at least one sensor device for detecting at least one parameter from the cooking appliance that influences the cooking process.

7. The system of claim 6, wherein the transmitting/receiving device of the primary unit is configured to wirelessly transmit the at least one parameter to the remote regulating unit, and wherein the remote regulating unit is configured to evaluate the at least one parameter.

8. The system of claim 6, wherein the at least one sensor device comprises at least one of a temperature sensor, a pressure sensor, and a filling level sensor.

9. The system of claim 8, wherein the temperature sensor is an NTC or PTC resistor.

10. The system of claim 1, wherein the remote regulating unit includes a display device configured to display the handling instructions for instructing the user when to add the first and second foods to the cooking appliance and for instructing the user to maintain the cooking appliance at the fixed intermediate temperature.

11. The system of claim 1, wherein the indicator of the primary unit is a display device configured to display the handling instructions for instructing the user when to add the first and second foods to the cooking appliance and for instructing the user to maintain the cooking appliance at the fixed intermediate temperature.

12. The system of claim 1, wherein the remote regulating unit is configured as a smartphone, a laptop computer, a tablet computer, or a personal computer (PC).

13. The system of claim 1, wherein the fixed intermediate temperature is greater than a first optimal cooking temperature associated with the first food and less than a second optimal cooking temperature associated with the second food.

14. The system of claim 13, wherein the first cook time is less than a first optimal cook time associated with the first food and the second cook time is greater than a second optimal cook time associated with the second food.

15. The system of claim 1, wherein the wireless communication between the primary unit and the remote regulating unit takes place via at least one of WLAN (wireless local area network), Bluetooth, GSM (global system for mobile communications), UMTS (universal mobile telecommunications system), DECT (digital enhanced cordless telecommunications), and RFID (radio frequency identification).

16. The system of claim 1, wherein the indicator of the primary unit includes one or more light emitting diodes (LEDs) configured to generate a signal on receipt of handling instructions and/or when a deviation between an actual temperature and the fixed intermediate temperature exceeds a predetermined threshold.

17. The system of claim 1, further comprising a plurality of primary units removably mounted on a plurality of cooking appliances, wherein the remote regulating unit is configured to monitor each of the plurality of primary units.

18. A remote unit for regulating operations of a cooking process, the remote unit comprising:
- a wireless communication unit for wirelessly communicating with a primary unit removably mounted on a cooking appliance configured for concurrently cooking first and second different foods; and
- a calculating unit configured to calculate a fixed intermediate temperature for cooking the first and second foods concurrently;
- wherein the calculating unit is further configured to calculate a first cook time for cooking the first food at the fixed intermediate temperature and a second cook time for cooking the second food at the fixed intermediate temperature;
- wherein the calculating unit is further configured to calculate first and second start times based on the first and second cook times, the first start time defining when the first food should be added to the cooking appliance and the second start time defining when the second food should be added to the cooking appliance, the first and second start times being calculated so that the cooking appliance operating at the fixed intermediate temperature completes the cooking of the first and second foods at the same time; and
- wherein the wireless communication unit is configured to wirelessly transmit handling instructions to the primary unit to instruct a user when to add the first and second foods to the cooking appliance based on the first and second start times and to instruct the user to maintain the cooking appliance at the fixed intermediate temperature.

19. A cooking apparatus comprising:
- a cooking appliance configured for concurrently cooking a first food and a second food, wherein the first food is different from the second food;
- a primary unit including an indicator for indicating cooking instructions to a user and a transmitting/receiving device for wireless communication, the primary unit configured to be removably mounted on the cooking appliance; and
- a remote regulating unit physically separated from the primary unit and cooking appliance, the remote regulating unit configured for wirelessly communicating with the transmitting/receiving device of the primary unit;
- wherein the remote regulating unit is configured to calculate a fixed intermediate temperature for cooking the first and second foods concurrently;
- wherein the remote regulating unit is further configured to calculate a first cook time for cooking the first food at the fixed intermediate temperature and a second cook time for cooking the second food at the fixed intermediate temperature;
- wherein the remote regulating unit is further configured to calculate first and second start times based on the first and second cook times, the first start time defining when the first food should be added to the cooking appliance and the second start time defining when the second food should be added to the cooking appliance, the first and second start times being calculated so that the cooking appliance operating at the fixed intermediate temperature completes the cooking of the first and second foods at the same time; and
- wherein the remote regulating unit is further configured to wirelessly transmit handling instructions to the primary unit to instruct the user when to add the first and second foods to the cooking appliance based on the first and second start times and to instruct the user to maintain the cooking appliance at the fixed intermediate temperature.

* * * * *